J. F. WILES.
NUT-LOCK.

No. 171,898. Patented Jan. 4, 1876.

WITNESSES.
Chas. J. Gooch
Le Blond Burdett

INVENTOR.
John Fletcher Wiles.
By Knight Bros

N. PETERS, PHOTO-LITHOGRAPHER, WASHINGTON, D.C.

UNITED STATES PATENT OFFICE.

JOHN FLETCHER WILES, OF LONDON, ENGLAND.

IMPROVEMENT IN NUT-LOCKS.

Specification forming part of Letters Patent No. 171,898, dated January 4, 1876; application filed October 8, 1875.

*To all whom it may concern:*

Be it known that I, JOHN FLETCHER WILES, of Sun Court, Cornhill, in the city of London, England, have invented certain Improvements in Lock or Jam Nuts, of which the following is a specification:

The invention has for its object improvements in lock or jam nuts. For this purpose, instead of employing one nut to jam another upon the bolt or screw, as heretofore, I, according to my invention, employ a single nut, which is cut or split almost into two in a plane across the axis of the bolt or screw, the two parts being connected together by a small piece. In connection with this split nut I employ a screw, acting to force the two parts of the nut toward or apart from each other at their split ends; or, if desired, two separate nuts may be employed, in which case, instead of jamming the one upon the other, as heretofore, they may be forced apart or toward each other by the means heretofore described; and in order that my said invention may be more clearly understood and readily carried into effect I will proceed, aided by the accompanying drawings, more fully to describe the same.

Figure 3:
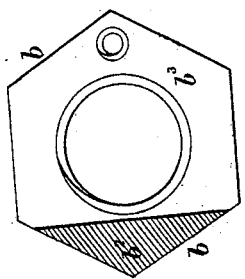
Figure 1:
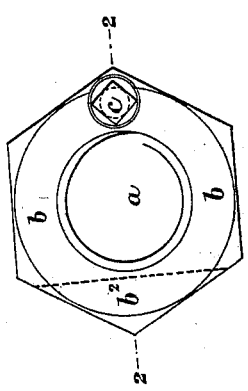
Figure 2:
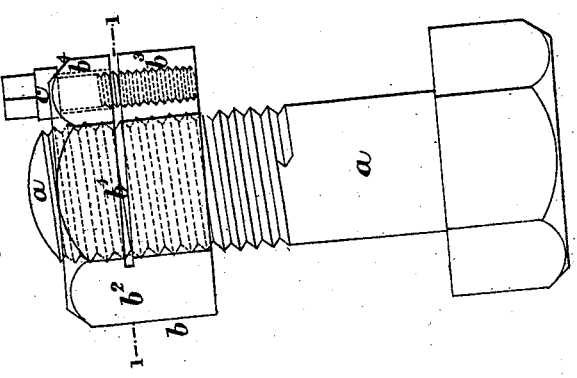

Figure 1 represents a plan; Fig. 2, a side view; Fig. 3, a cross-section through the nut on the line 1 1 of Fig. 2; and Fig. 4, a cross-section through the nut on the line 2 2 of Fig. 1, of the preferred form in which I carry my invention into effect.

$a$ represents a bolt or screw having my improved lock or jam nut $b$ applied thereto. This nut $b$ is, according to my invention, cut or split at $b^1$ nearly into two parts, which are connected together at the part $b^2$. When it is desired to jam or lock the nut $b$ on the bolt $a$, the two parts of the nut are drawn toward each other by means of the screw $c$, which is tapped into the lower part $b^3$ of the nut, and passes freely through the part $b^4$, while a shoulder on the screw $c$ takes a bearing upon the outside of the part $b^4$. Thus, by turning the screw $c$ in the one direction, the nut $b$ becomes jammed or locked on the bolt or screw $a$, and by turning it in the contrary direction the nut $b$ is released.

Figure 6:
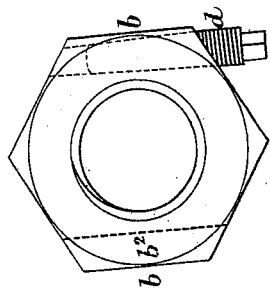
Figure 7:
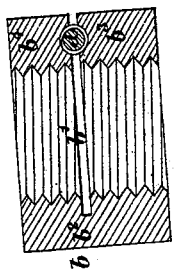
Figure 5:
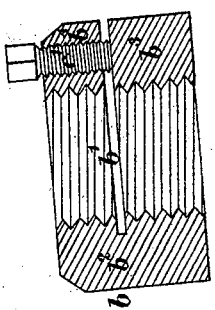

If desired, instead of employing a screw, $c$, tapped into the part $b^3$ of the nut, a small bolt, passing freely through the parts $b^3$ and $b^4$, may be employed in combination with a nut, to force the two parts of the lock or jam nut together, as will be well understood; or, as shown at Fig. 5, the two parts $b^3$ $b^4$ of the nut $b$ may be forced apart from each other to jam or lock them on a screw or bolt by means of a screw, $c'$, tapped into the part $b^4$, and pressing, when turned in one direction, upon the part $b^3$; or the two parts $b^3$ $b^4$ of the nut $b$ may be forced apart to lock or jam the nut $b$ upon a bolt or screw by means of a tapered screw, $d$, working in a suitable thread or female screw formed in the parts $b^3$ $b^4$, as shown at Figs. 6 and 7.

Figure 4:
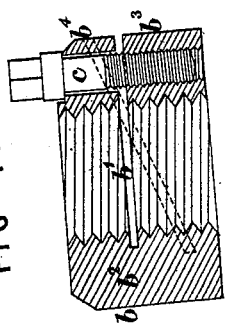

I would here remark that, instead of cutting or splitting the nut $b$ in a line parallel with the top and bottom of the nut, as shown, the split or cut $b^1$ may be made at an angle thereto, as shown by dotted lines at Fig. 4.

Figure 8:
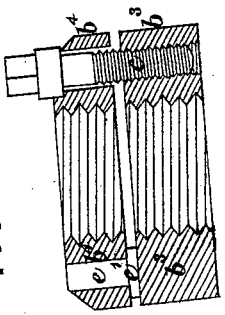

If desired, however, instead of employing a single nut, $b$, cut nearly into two, as hereinbefore shown and described, two separate nuts may be employed, as shown at Fig. 8, in which case I prefer to connect the two together by means of a stud or projection, $e$, on the one passing into a hole or recess in the other, a distance-piece, $e'$, being employed to keep the two nuts $b^3$ $b^4$ apart the proper distance, a screw, $c$, being preferably employed to force the nuts $b^3$ $b^4$ toward each other, to lock or jam the nuts upon a bolt or screw; or, if desired, the pin $e$ and distance-piece $e'$ may be dispensed with, or either of them may be employed without the other, and any of the arrangements hereinbefore described may be employed to force the nuts $b^3$ $b^4$ toward or away from each other when on a screw or bolt, for the purpose of locking or jamming them thereon.

I would here remark that in the arrangements represented at Figs. 1, 2, 3, 4, 5, and 8 the nut $b$ may be freely acted upon by an ordinary spanner or other tool, as the locking means do not project from the sides thereof.

Having thus described the nature of my said invention, and the mode in which I carry the same into effect, I would have it understood that what I claim is—

A lock or jam nut constructed in two parts or leaves, in combination with a screw for forcing the leaves together or apart, to lock the nut on its bolt, substantially as described.

JOHN F. WILES.

Witnesses:
B. J. B. MILLS,
C. M. WHITE,
    23 *Southampton Buildings, London.*